United States Patent
Korneluk et al.

(10) Patent No.: US 7,620,403 B2
(45) Date of Patent: Nov. 17, 2009

(54) METHOD AND APPARATUS FOR PROVIDING REFERENCE FREQUENCY AIDING AMONG PEERS OPERATING IN A DIRECT COMMUNICATION MODE

(75) Inventors: Jose E. Korneluk, Boynton Beach, FL (US); Bobby D. Anderson, Gilbert, AZ (US); Kristi A. Haverkamp, Chandler, AZ (US); Keith M. Klug, Mesa, AZ (US); Charles H. Segerson, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 578 days.

(21) Appl. No.: 11/194,010

(22) Filed: Jul. 29, 2005

(65) Prior Publication Data

US 2007/0026792 A1  Feb. 1, 2007

(51) Int. Cl.
*H04W 24/00* (2009.01)
*H04B 7/185* (2006.01)
*H04B 7/12* (2006.01)
*H04B 15/00* (2006.01)
*H04B 7/00* (2006.01)
*G01S 1/00* (2006.01)
*H04W 4/00* (2009.01)
*H04J 3/06* (2006.01)

(52) U.S. Cl. .................. 455/456.1; 455/12.1; 455/141; 455/502; 455/526; 342/357.02; 342/357.06; 342/358; 370/328; 370/332; 370/513

(58) Field of Classification Search ................ 455/12.1, 455/71, 141, 258, 404.1, 404.2, 414.1, 414.2, 455/426.1, 452.2, 456.1–456.6, 11.1, 13.1, 455/75, 76, 77, 259, 526, 62, 151.3, 152.1, 455/119, 173.1, 315, 502; 342/357, 357.1, 342/457, 357.02, 357.06, 357.09, 357.14, 342/357.15, 358, 357.01, 215, 216; 701/215, 701/216; 370/328, 332, 395.62, 513
See application file for complete search history.

(56) References Cited

U.S. PATENT DOCUMENTS 5,739,786 A * 4/1998 Greenspan et al. ....... 342/357.1
5,841,396 A   11/1998 Krasner (Continued)

FOREIGN PATENT DOCUMENTS

WO    WO02/065669 A2    8/2002

(Continued)

*Primary Examiner*—Nay A Maung
*Assistant Examiner*—Paul P Tran

(57) ABSTRACT

A mobile communication device (202) and peer mobile communication devices (204, 206) are capable of direct voice and data communication. The mobile communication device has a reference oscillator (104) which is used for generating operating frequencies, and is subject to frequency errors resulting from manufacturing tolerances, heat, and other error sources. The mobile communication device receives a frequency correction message (506) from a peer mobile communication device that has calibrated its reference oscillator. The frequency correction message contain offset information which is used by the mobile communication device to determine its offset (316) from a nominal frequency (302).

6 Claims, 5 Drawing Sheets

U.S. PATENT DOCUMENTS

| | | | |
|---|---|---|---|
| 5,940,747 A * | 8/1999 | Grohgans et al. | 455/168.1 |
| 6,026,307 A * | 2/2000 | Blom et al. | 455/118 |
| 6,041,222 A | 3/2000 | Horton et al. | |
| 6,240,276 B1 * | 5/2001 | Camp, Jr. | 455/71 |
| 6,671,291 B1 | 12/2003 | Soliman | |
| 6,741,842 B2 | 5/2004 | Goldberg et al. | |
| 6,816,111 B2 * | 11/2004 | Krasner | 342/357.12 |
| 6,907,224 B2 * | 6/2005 | Younis | 455/12.1 |
| 7,050,787 B2 * | 5/2006 | Caci | 455/404.2 |
| 7,149,197 B2 * | 12/2006 | Garahi et al. | 370/328 |
| 7,277,049 B2 * | 10/2007 | Korneluk et al. | 342/357.09 |
| 2003/0078062 A1 * | 4/2003 | Burr | 455/502 |
| 2005/0074036 A1 * | 4/2005 | Gorday et al. | 370/513 |

FOREIGN PATENT DOCUMENTS

| | | |
|---|---|---|
| WO | WO02/065669 A3 | 8/2002 |

* cited by examiner

METHOD AND APPARATUS FOR PROVIDING REFERENCE FREQUENCY AIDING AMONG PEERS OPERATING IN A DIRECT COMMUNICATION MODE

TECHNICAL FIELD

This invention relates in general to mobile communication devices, and more particularly to mobile communication devices that have a positioning receiver operable in an autonomous location determination mode, and where the mobile communication device is operable in a direct communication, off-network mode.

BACKGROUND OF THE INVENTION

Mobile communication devices are in widespread use throughout metropolitan regions of the world. These devices are increasingly common and affordable, and to remain competitive manufactures have sought to include additional functionality in them. For example, manufactures are now including positioning receivers in mobile communication devices to support a number of location applications, such as location reporting for emergency services, and navigation.

The use of satellite positioning receivers in mobile communication devices was initially driven by safety concerns related to locating a person calling emergency services using a mobile communication device. Although it is simple to determine the cell location of a mobile caller, the area encompassed by a cell may be quite large, especially in rural areas. Therefore some governments are now requiring that mobile communication devices include a means for determining their own location and reporting it when necessary, such as when the mobile communication device user calls an emergency phone number. Although numerous methods of approximate location determination have been developed, using such techniques as triangulation and relative power levels of signals received from base station radios in the vicinity of the mobile communication device, these methods have not proven sufficiently reliable or precise.

The preferred means of providing location determination in a mobile communication device is to include a satellite positioning receiver. However, this approach is not without significant design challenges. For one, the time needed for a satellite position receiver to lock onto a sufficient number of positioning satellite signals from an autonomous or "cold" start can be significant, perhaps several minutes or longer, even in good signal conditions. Network aiding can reduce the time to first fix (TTFF) in producing a location report to a few seconds to a minute, depending on signal conditions. Network aiding can include GPS time, approximate location of a base station, and satellite ephemeris.

One reason for this latency in TTFF between aided fixes performed on a network and unaided fixes performed off-network is frequency error in the reference oscillator used in the mobile communication device. The reference oscillator is typically susceptible to error from its nominal assigned frequency induced by temperature, thermal drift, age, and manufacturing tolerances, among other factors. High stability and precise oscillators are available, but they are so expensive that in the realm of mobile communication devices, where price is a critical market factor, it is impractical to use them. An alternative to the high priced compensated oscillator is to rely on the frequency precision of a communication system, where the mobile communication device locks onto a precision frequency signal transmitted by a base station, and determines its own frequency error. Thus, the precision frequency signal allows a satellite positioning receiver equipped mobile communication device to reduce the time to first fix by eliminating the frequency error in performing the fix.

However, some mobile communication devices are being manufactured with the ability to communicate directly with other mobile communication devices. Direct communication allows mobile communication devices to communicate with each other even when outside of communication system coverage. Some mobile communication devices may be designed that only communicate directly with other mobile communication devices, and are not capable of network communication. The precision frequency signal of a network base station is unavailable to mobile communication devices outside the coverage area of a communication system, as well as mobile communication devices that are unable to communicate with the network. Therefore there is a need for a way in which a mobile communication device operating in a remote area outside the coverage of a communication system can reduce the time needed to perform a location determination.

DETAILED DESCRIPTION

Figure 1:
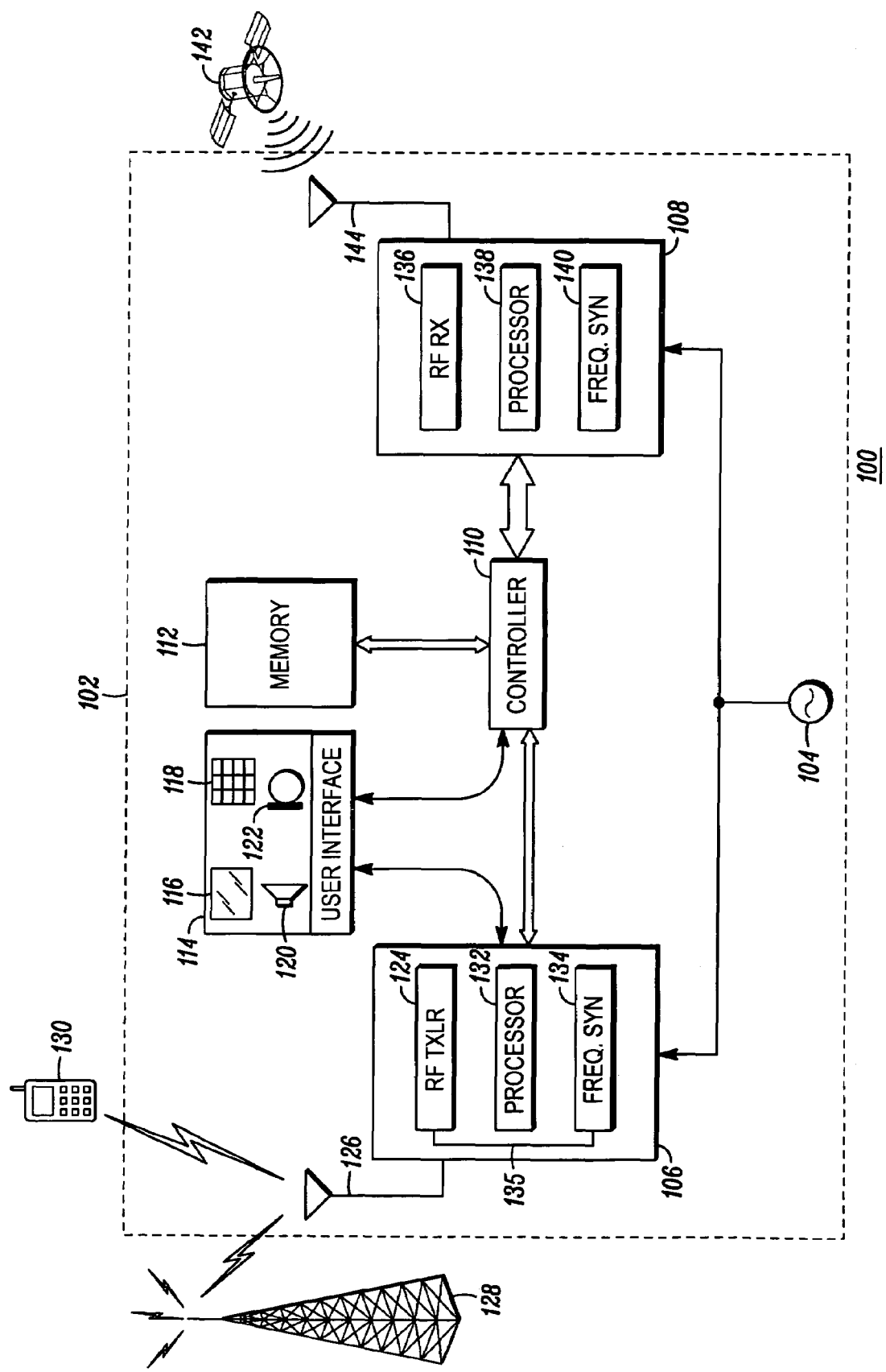
FIG. 1 shows a block schematic diagram of a mobile communication device in accordance with an embodiment of the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of the long time needed to acquire positioning signals at a mobile communication device when the mobile communication device is operated out of range of a communication system and has not otherwise characterized its reference oscillator's offset error by receiving a frequency correction message directly from a peer mobile communication device which has characterized its reference oscillator's offset error. This corrected mobile communication device transmits at an uncorrected nominal frequency, offset from a reference frequency by the known offset. In the transmission message, the corrected mobile communication device indicates its offset, thereby allowing the uncorrected mobile communication device which receives the message to determine its reference oscillator's offset from the reference frequency, thereby characterizing its offset error, and allowing precision tuning in subsequent radio operations.

Referring now to FIG. 1, there is shown a block schematic diagram 100 of a mobile communication device 102, in accordance with an embodiment of the invention. The mobile communication device 102 includes a reference oscillator 104 that is shared between at least a communications transceiver 106 and a satellite positioning receiver 108. Both the communication transceiver and the satellite positioning receiver are operated under control of a controller 110, in accordance with executable machine readable instruction code stored on a memory 112 of the mobile communication device. The controller further operates a user interface 114 to allow a user of the mobile communication device to interact with the mobile communication device and give commands to operate the mobile communication device. Typically the user interface includes a display 116 for displaying information to the user; a keypad and buttons 118 for entering information; and an audio system including at least a speaker 120 for playing audio signals and a microphone 122 for converting acoustic signals to electrical signals.

The communications transceiver 106 may be a conventional radio telephony transceiver, such as one operating according to any of the well known air interfaces, and is capable of sending and receiving messaging in addition to voice and audio signals. The communications transceiver includes a radio frequency transceiver 124 coupled to an antenna 126 for communicating radio signals to and from communication system base stations 128, but is also capable of direct radio communication with other so-equipped mobile communication devices 130. Note that, in using the direct communication mode, the communications transceiver may use the same RF transceiver for the direct communication mode as it does for communicating with the communication system base station, although it is contemplated that different transceivers may be used if the mobile communication device includes more than one transceiver.

The RF transceiver includes modulation, demodulation, and other radio frequency operation. The RF transceiver is operably coupled to a processor 132 which processes data to be transmitted, as well as data received over the RF transceiver. Functions include, for example, mapping digital data onto quadrature constellations, forward error encoding and decoding, digital filtering, and so on, as is well known in the art. The communications transceiver is operably coupled to the user interface to provide audio signals to be played over a speaker of the user interface, as well as to receive audio signals produced from a microphone of the user interface. The communications transceiver also includes a local frequency synthesizer 134 which generates the operating frequency of the RF transceiver in accordance with a tuning input. To tune the communications transceiver of the mobile communication device, the frequency synthesizer is adjusted so that an output frequency 135 of the frequency synthesizer used to down-mix a signal received at the communications transceiver is substantially equal to the frequency of the signal to be received. Likewise, for signals transmitted by the mobile communication device, the frequency synthesizer is tuned to the frequency at which the signal is to be transmitted. Furthermore, multiple frequencies may be generated for heterodyne operation, as is known. Frequency synthesizers typically are tuned using a digital tuning word which corresponds to the desired frequency. The digital tuning word is typically provided by a controller or other processor, and may be latched at the frequency synthesizer. The digital control words may be derived in correspondence with the desired frequency output, or they may be stored in a table in a memory of the mobile communication device in correspondence with frequencies or channel numbers, for example. As it is known that the reference oscillator, from which the operating frequency is generated, may drift or otherwise be imprecise, it is routine to tune the frequency synthesizer from an uncorrected nominal value to a value offset from the uncorrected nominal value to correct for frequency errors so that the operating frequency is substantially the desired frequency. This may be performed, for example, by sweeping the tuning value in a window around the uncorrected nominal tuning value until a signal is detected, and further refinement may occur to determine the precise tuning value yielding the strongest signal. Once the offset from the uncorrected nominal is determined, a similar offset may be applied when tuning to other frequencies, such as when a handing a call over to a new base station. However, as temperature may affect reference oscillator frequency, an offset is only considered as a starting point in subsequent tuning events, especially as time passes since the most recent tuning event.

Similar to the communications transceiver, the positioning receiver 108 includes a radio frequency receiver 136 for receiving satellite signals, a processor 138 for processing the received signals, and a tunable frequency synthesizer 140 for generating operating frequencies from the reference oscillator 104. The positioning receiver receives signals from positioning satellites 142 in orbit around the Earth via an antenna 144. In order to determine its location, the positioning receiver must receive the signals of four satellites. Three satellites may be used if one or more location parameters, such as elevation, is assumed. With each different satellite, the operating frequency ranges must be searched to locate different satellites, and due to Doppler shift in the signals as the satellites orbit, the offset used in relation to a nominal frequency for one satellite will likely not apply to another satellite. However, a chief source of error is the reference oscillator itself.

Figure 2:
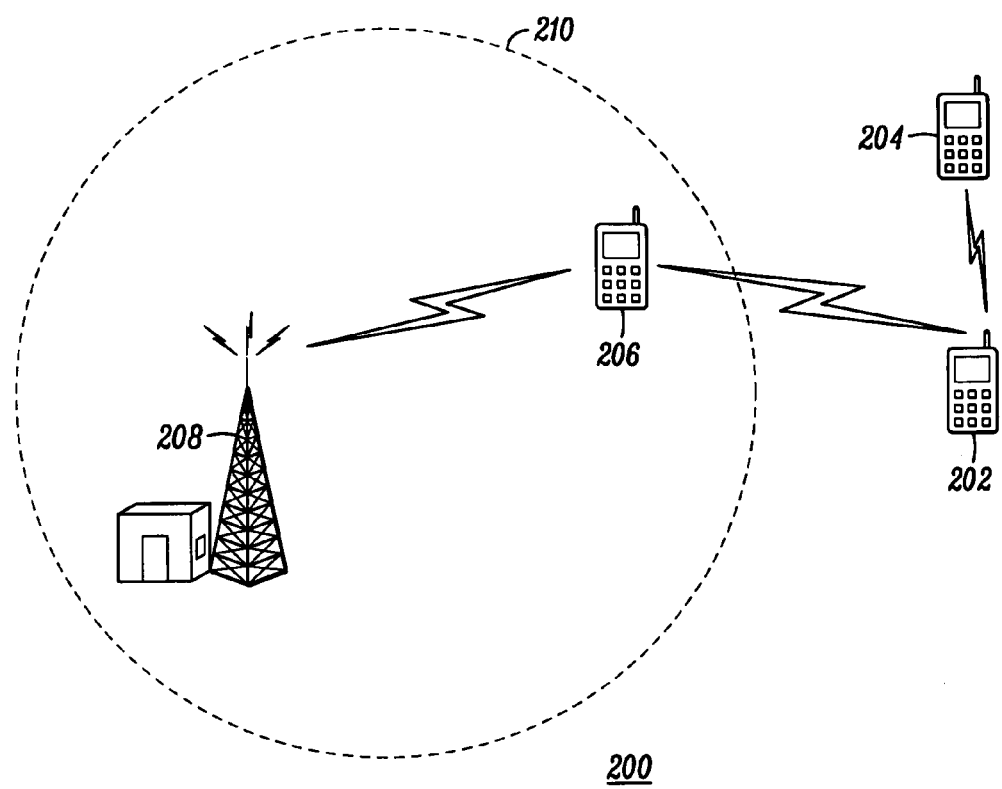
FIG. 2 shows a diagram illustrating peer to peer calling, in accordance with an embodiment of the invention.

According to the invention, the uncorrected mobile communication device 102 communicates with a corrected mobile communication device 130 to receive information allowing the uncorrected mobile communication device to determine its reference oscillator offset error. Referring now to FIG. 2, there is shown a diagram 200 illustrating peer to peer calling, in accordance with an embodiment of the invention. An uncorrected mobile communication device 202 is situated outside the border 210 of a communication system base station 208, but within direct range of corrected mobile communication devices 204, 206. Corrected mobile communication device 206 is within range of base station 208, and is therefore able to receive a precision frequency signal and correct an offset of its reference oscillator. Corrected mobile communication device 204 is, like mobile communication device 202, outside the range of the base station 208, but, according to the invention, has performed a location determination, and having done so, is informed as to its reference oscillator offset. The signals transmitted by positioning satellites are highly precise, and in fact they are used by communication base stations to calibrate their reference oscillators to generate high precision frequencies. The mobile communication devices 202, 204, and 206 are all capable of direct communication with each other, such as by asynchronous communication in the Industrial, Scientific, and Medical frequency bands (902-928 MHz, 2400-2483 MHz, 5725-5780 MHz), which permit for unlicensed radio communication operation, as is known. Direct mode communication may occur equivalently in other bands using different protocols. In order for the uncorrected mobile communication device 202 to determine its own reference oscillator's offset, it could perform an autonomous location determination, but that could take several minutes, or longer. To reduce the time to perform a location determination, the uncorrected mobile communication device receives a signal transmitted by one of the corrected mobile communication devices 204, 206 at an uncorrected nominal frequency generated by the corrected mobile communication device. The uncorrected nominal frequency is offset from a target or reference frequency due to an inherent frequency error of the corrected mobile communication device's reference oscillator. Each of the mobile communication devices 202, 204, 206 may initially tune their frequency synthesizers to an uncorrected nominal frequency, but given different errors in each of their reference oscillators, the resulting frequencies actually generated by each of the mobile communication devices may be different from one another. While it is intended that the uncorrected nominal frequency be close to the target or reference frequency, due to the inherent offset at each mobile communication device, tuning to an uncorrected nominal frequency will result in a frequency that is offset from the target or reference frequency generally intended by the nominal frequency. As such, were each mobile communication device to tune to a particular nominal frequency, it is likely the result would be each operating at a different frequency as each one would have a different offset due to differences in temperature, manufacturing tolerances, and so on.

Figure 3:
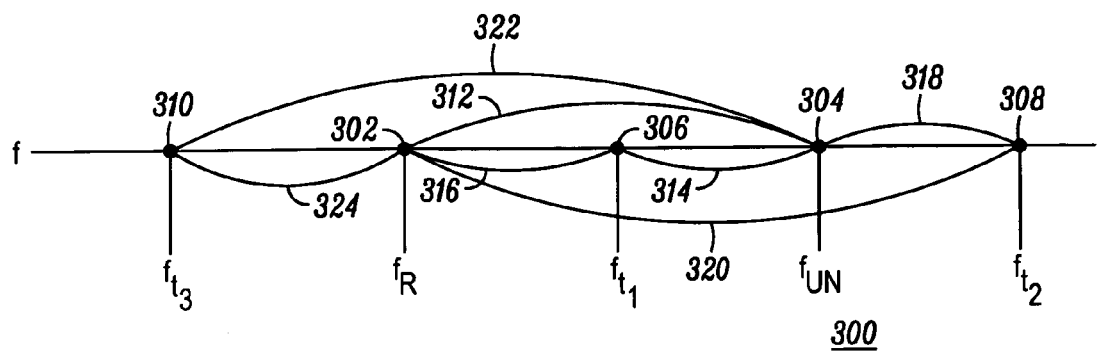
FIG. 3 shows a frequency line graph illustrating frequency errors among peers, in accordance with an embodiment of the invention.

Referring to FIG. 3, there is shown a frequency line graph 300 illustrating frequency errors among peer mobile communication devices, in accordance with an embodiment of the invention. A target or reference frequency $f_R$ 302 is a nominal frequency at or near which communication occurs. The uncorrected nominal frequency $f_{un}$ 304 is the frequency at which the corrected mobile communication device transmits when initially tuned to the nominal frequency, without correcting for reference oscillator offset. However, as meant here, the uncorrected nominal frequency also includes any frequency within a predetermined tolerance band or window around the actual frequency. Therefore, the uncorrected nominal frequency would include transmitting at the actual uncorrected nominal frequency plus or minus some small offset that keeps the resulting frequency within that tolerance window around the actual frequency. Note that in the present example the uncorrected offset frequency is offset from the actual or reference frequency 302 by an offset 312. A first uncorrected mobile communication device receives at $f_{r1}$ 306, which is the resulting frequency when the first uncorrected mobile communication device tunes to the nominal frequency without correction, which produces an offset 316. The first uncorrected mobile communication device must tune up by a first tuning offset 314 to lock onto a signal transmitted by the corrected mobile communication device transmitting at $f_{un}$ 304. To detect the signal at $f_{un}$, a mobile communication device begins adjusting its tuning from its nominal tune setting until the operating frequency of the mobile communication device is near $f_{un}$, when the receiver of the mobile communication device will detect an increase in power, for example. According to the invention, the corrected mobile communication device transmits its offset 312 from $f_R$ to the uncorrected mobile communication device. Since the uncorrected mobile communication device determines how much it had to tune up to lock onto $f_{un}$, it can calculate its offset 316 by subtracting the amount it had to tune up 314 from the corrected mobile communication device's offset 312. Likewise, a second uncorrected mobile communication device operating at an uncorrected nominal frequency $f_{r2}$ 308 can lock onto $f_{un}$, after tuning down by a tuning offset 318, and determine its offset 320 from the nominal frequency. Finally, a third uncorrected mobile communication device operating at $f_{r3}$ has to tune up by a tuning offset 322, which is greater than its offset from $f_R$ to lock onto $f_{un}$, and receive the frequency correction message. However, the difference of tuning offset 322 and the offset of $f_{un}$ from $f_R$ (312) yields the third uncorrected mobile communication device's offset 324 from nominal. The information transmitted by the corrected mobile communication device may simply be a signed digital word which may be used directly with the digital control word used to tune the frequency synthesizer of the mobile communication devices. By using a signed digital word, determining the offset is a matter of simple arithmetic. For example, if the first uncorrected mobile communication device simply subtracts the corrected mobile communication device's offset 312, which may be a positive value since it is offset above the nominal frequency 302, from the tuning offset value 314 the result will be a negative value corresponding in magnitude to the offset 316.

Figure 4:
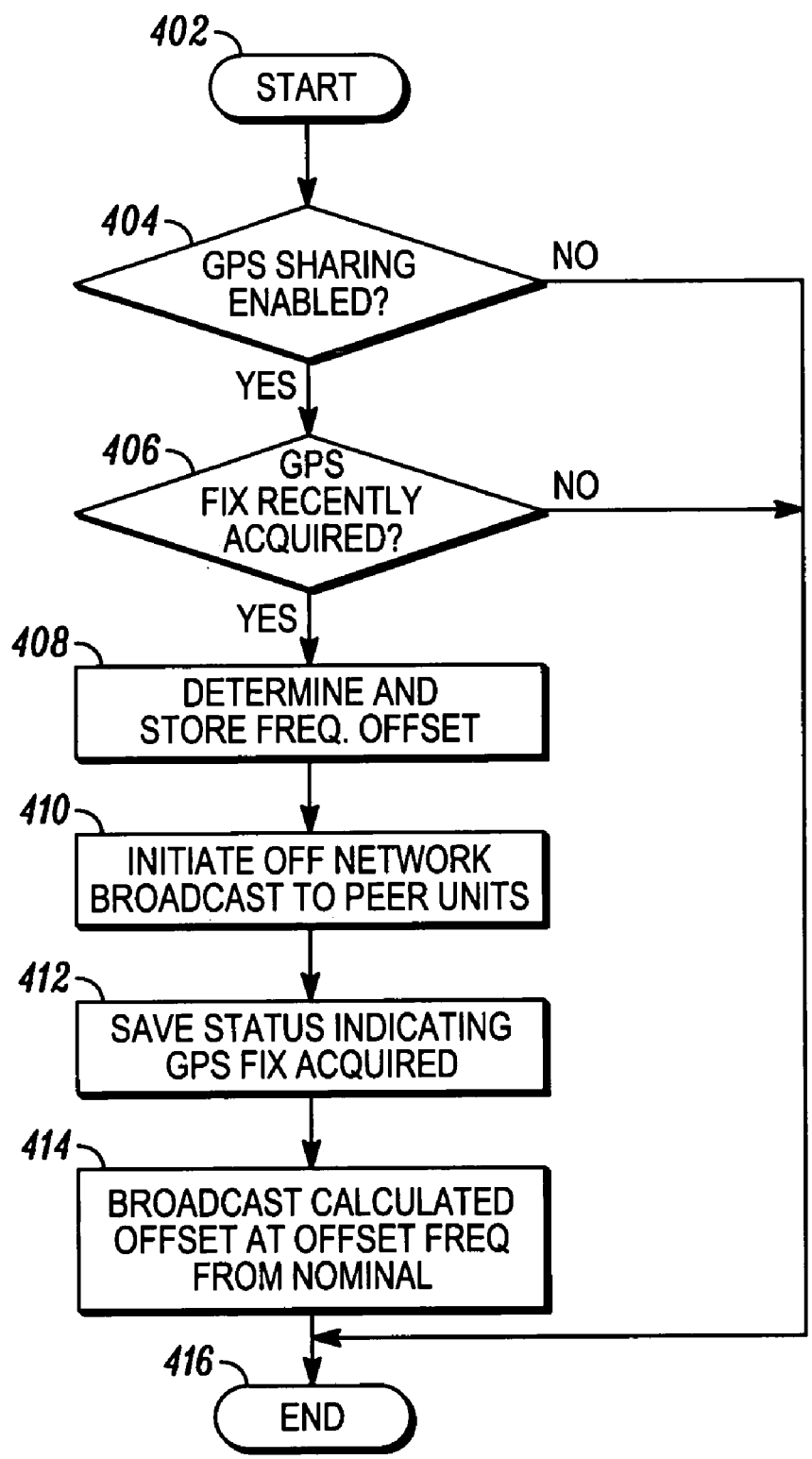
FIG. 4 shows a flow chart diagram of a method of facilitating acquisition of a positioning signal at an uncorrected mobile communication device, as performed by a corrected mobile communication device, in accordance with the invention.

Referring now to FIG. 4, there is shown a flow chart diagram 400 of a method of facilitating acquisition of a positioning signal at an uncorrected mobile communication device, as performed by a corrected mobile communication device, in accordance with the invention. At the start 402, the corrected mobile communication device is powered up and ready to communicate in a direct mode with nearby mobile communication devices. According to an embodiment of the invention, the mobile communication devices may have a user interface control to enable sharing of offset information (404). If sharing is enabled, then the mobile communication device determines if a location determination, or fix, has recently been performed (406). If so, then the mobile communication device determines its reference oscillator's frequency offset (408). Thereafter, it initiates an off-network, or direct transmission to nearby mobile communication devices (410). Again, as used here, the term "direct" refers to communication directly between mobile communication devices, without the use of a communications network or system. The transmission may be performed spontaneously, or in response to receiving a request from an uncorrected mobile communication device. Upon initiating the call, the corrected mobile communication device may commence saving a status that a location determination has been performed (412), such as by simply setting a status flag in memory. Subsequent to initiating the off-network broadcast, the corrected mobile communication device commences broadcasting its offset information at an uncorrected nominal frequency (414) in a frequency correction message. For example, the corrected mobile communication device may tune to an uncorrected nominal frequency by applying a nominal tuning value to its frequency synthesizer. The result is that the mobile communication device transmits at an uncorrected nominal frequency that is offset from the target or reference frequency corresponding to the nominal frequency. The process finishes (414) when the broadcast is completed. The corrected mobile communication device may repeat the broadcast at periodic intervals, or in response to subsequent broadcast requests. Thus, by transmitting at an uncorrected nominal frequency, and indicating its offset from the reference frequency, the uncorrected mobile communication device can determine its offset from the reference frequency.

Figure 5:
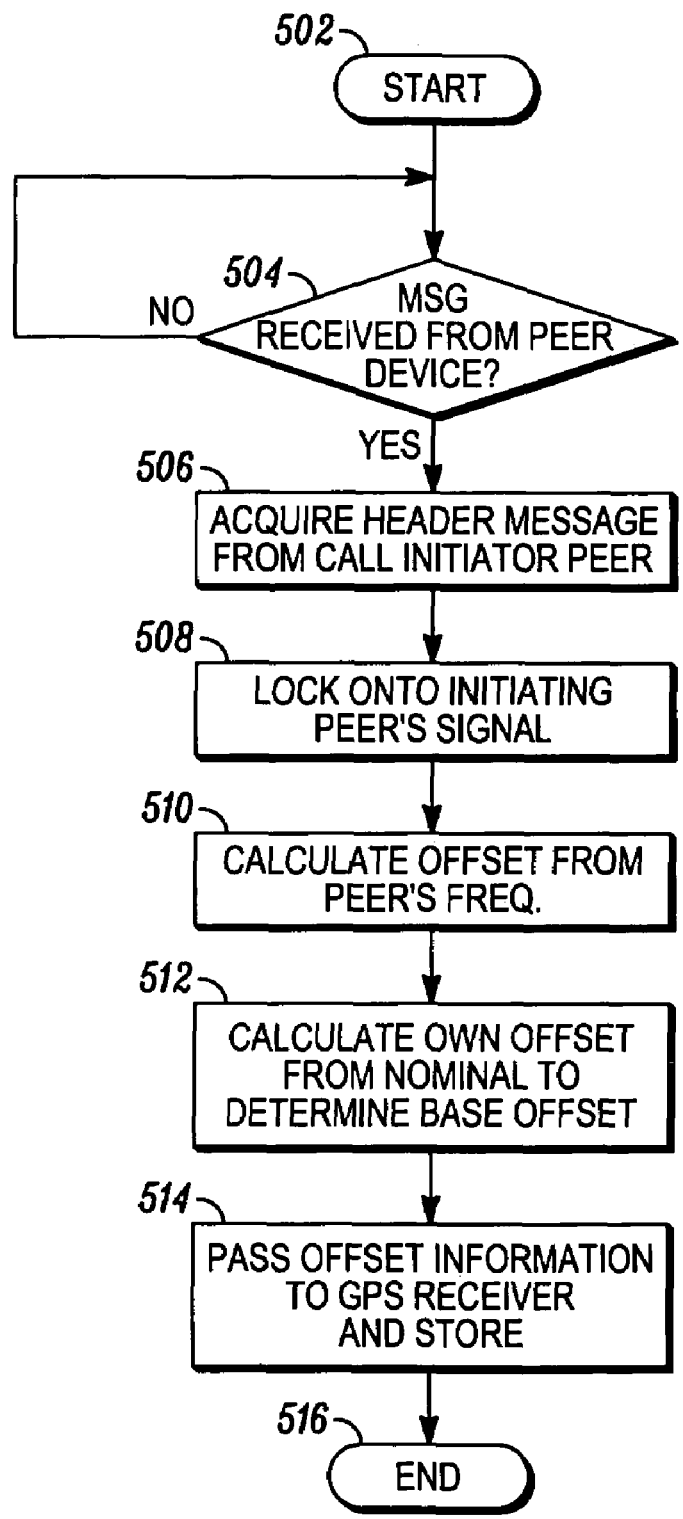
FIG. 5 shows a flow chart diagram of a method of acquiring a positioning signal at an uncorrected mobile communication device, in accordance with the invention.

Referring now to FIG. 5, there is shown a flow chart diagram 500 of a method of acquiring a positioning signal at an uncorrected mobile communication device, in accordance with the invention. At the start 502 of the process, the uncorrected mobile communication device is powered on, but has not performed a location determination. The uncorrected mobile communication device is also out of range of any network base station, or is otherwise incapable of receiving signals from such base station. Upon commencement of the process, the uncorrected mobile communication device must determine if a corrected mobile communication device is transmitting a frequency correction message (504). The uncorrected mobile communication device may scan in a frequency band around an uncorrected nominal frequency as tuned by the uncorrected mobile communication device. The uncorrected nominal frequency is the result of attempting to tune to a nominal or reference frequency, but due to frequency errors in the mobile communication device, the uncorrected nominal frequency is offset from the reference frequency. It is likely the corrected mobile communication device will transmit at a frequency offset from both the nominal frequency and the uncorrected mobile communication device's uncorrected nominal frequency. It is further contemplated that the direct mode of communication may require the mobile communication devices to frequency hop in a known sequence. Furthermore, the corrected mobile communication device may be transmitting spontaneously, or it may be transmitting in response to a broadcast frequency correction request message sent by the uncorrected mobile communication device. Locating the frequency correction message may be performed by carrier sensing, or other detection techniques, as are known. Once a candidate signal is detected, the uncorrected mobile communication device attempts to acquire the header of the message (506). The uncorrected mobile communication device locks onto the corrected mobile communication device's uncorrected nominal frequency (508) to receive the message, and determine a tuning offset difference from the uncorrected nominal tuning setting. Using the tuning offset difference from the uncorrected mobile communication device's uncorrected nominal tuning value, and the offset indicated in the corrected mobile communication device's frequency correction message, the uncorrected mobile communication device can determine its reference oscillator offset from the uncorrected nominal frequency of the corrected mobile communication device (510) and then from the reference frequency (512). Once the offset of the reference oscillator is determined, the offset information can be passed to the positioning receiver (514). The positioning receivier can use the offset information to precisely tune its receiver, permitting smaller search band windows when searching for satellite signals. The method ends upon storage of the offset information, and use in performing a location determination via the positioning satellite signals (516).

Figure 6:
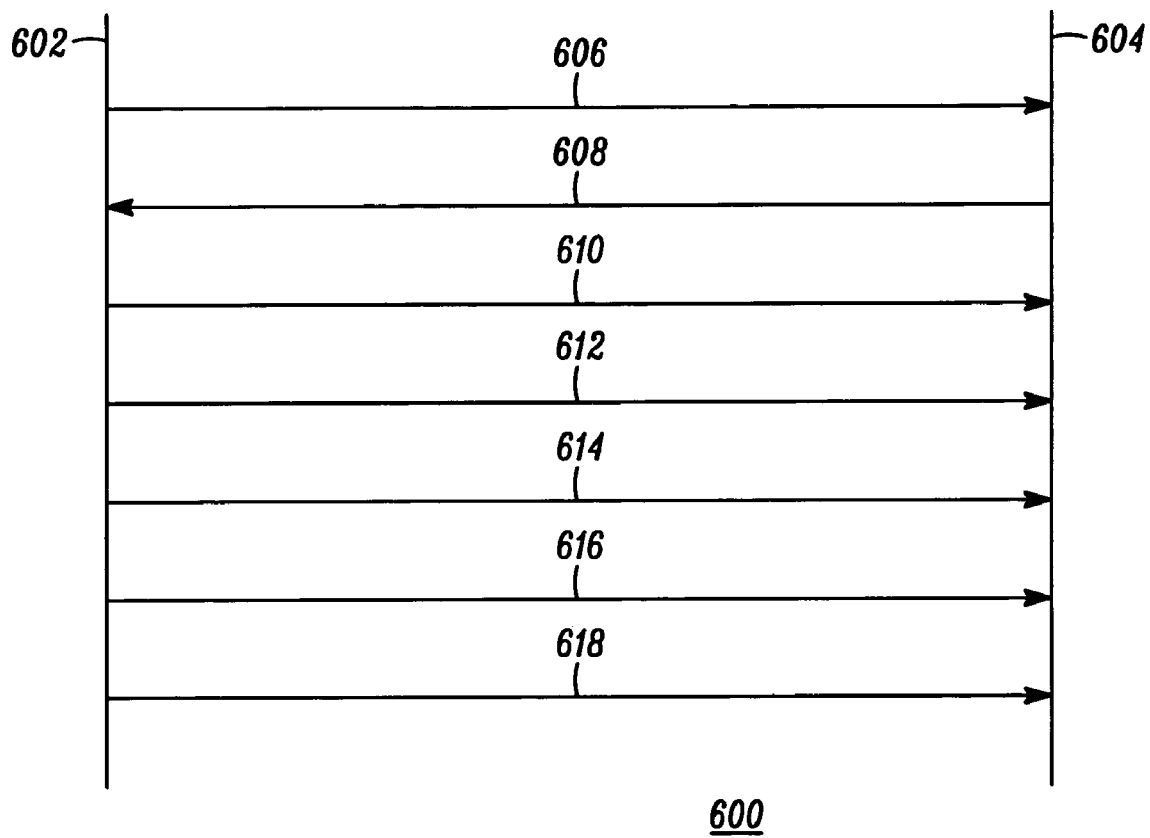
FIG. 6 shows a signal flow diagram of a signal flow between mobile communication device peers for acquiring positioning signals in accordance with an embodiment of the invention.

Referring now to FIG. 6, there is shown a signal flow diagram 600 of a signal flow between peer mobile communication devices for acquiring positioning signals and calibrating one mobile communication device's reference oscillator in accordance with an embodiment of he invention. The signals are between a corrected mobile communication device 602 that has performed a location determination or otherwise determined its reference oscillator's offset error, and an uncorrected mobile communication device 604, which is off-network and has not performed a location determination and so has not determined its reference oscillator's offset error. Since the mobile communication devices communicate directly, and given that the uncorrected mobile communication device is not frequency corrected with regard to its reference oscillator offset error, the corrected mobile communication device 602 commences transmitting a preamble and sync sequence 606 to allow the uncorrected mobile communication device to locate the signal. The preamble and sync sequence is transmitted at an uncorrected nominal frequency of the corrected mobile communication device. That is, despite the fact that the corrected mobile communication device 602 has determined its frequency offset, it does not correct for the offset error and instead transmits at its uncorrected nominal tuning setting for the given nominal frequency. The transmission of the preamble and sync for the purpose of allowing other mobile communication devices to perform frequency correction may be in response to receiving a request message from a nearby mobile communication device, or it may be a spontaneous broadcast commencing after performing a location determination and frequency correction, and it may be repeated at intervals of time. During this time the uncorrected mobile communication device 604 is searching for the preamble and sync in a frequency band around its uncorrected nominal tuning setting since its uncorrected nominal tuning setting results in a different operating frequency due to its own reference oscillator offset error. The searching may be conducted by any conventional search technique. Once the uncorrected mobile communication device locates the preamble and sync, it transmits an acknowledgement 608 to the corrected mobile communication device 602. Upon receiving the acknowledgement, the corrected mobile communication device 602 may transmit a private identifier 610, traffic frames of data 612, the frequency correction message 614, a last traffic frame 616 and a stop frame 618. The uncorrected mobile communication device 604 may further acknowledge the transmission subsequent to the stop frame 618. The frequency correction message indicates the offset of the uncorrected nominal frequency of the corrected mobile communication device 602 from the nominal frequency. Using this information, and having determined the tuning difference between the uncorrected nominal tuning setting and the corrected mobile communication device's uncorrected nominal frequency, the uncorrected mobile communication device can determine its offset from the nominal frequency.

Therefore, the invention provides a method of acquiring a positioning signal from a global positioning satellite at a positioning receiver of an uncorrected mobile communication device. The uncorrected mobile communication device has a reference oscillator having an offset error, but has not characterized or otherwise quantified the error, and is therefore unable to operate with frequency precision. The method commences by detecting a signal transmitted by a corrected mobile communication device at an uncorrected nominal frequency of the corrected mobile communication device. The corrected mobile communication device is a peer mobile communication device of the uncorrected mobile communication device that has characterized its reference oscillator's frequency error. The uncorrected nominal frequency is the resulting frequency at which the mobile communication device transmits when the frequency error is not compensated. That is, it results in the frequency of operation being offset from the actual nominal frequency due to the frequency error. This may be performed, for example, by applying a predetermined nominal tuning value to a frequency synthesizer without adjusting it to compensate for the known frequency error. The uncorrected mobile communication device commences tuning its communications transceiver to the uncorrected nominal frequency of the corrected mobile communication device. This entails changing its tune from its own uncorrected nominal frequency until it finds the signal at the corrected mobile communication device's uncorrected nominal frequency. The uncorrected mobile communication device then commences determining a tuning offset between the uncorrected nominal frequency of the uncorrected mobile communication device and the uncorrected nominal frequency of the corrected mobile communication device. That is, the uncorrected mobile communication device determines the amount of frequency change, and direction, it needed to change to find the signal from the corrected mobile communication device. Upon tuning to the uncorrected nominal frequency of the corrected mobile communication device, the uncorrected mobile communication device commences receiving a frequency correction message from the corrected mobile communication device at the uncorrected nominal frequency of the corrected mobile communication device which included the reference oscillator offset information of the corrected mobile communication device. The uncorrected mobile communication device extracts the reference oscillator offset information and compares it to its tuning offset to determine its reference offset. At this point the uncorrected mobile communication device has characterized its reference oscillator's frequency error and can compensate future tuning events for precision frequency operation. To assist in location determination the mobile communication device commences providing the reference offset to the positioning receiver since the positioning receiver shares the reference oscillator with the communications transceiver. As with the communications transceiver, the positioning receiver can adjust or compensate its tuning in accordance with the reference offset.

The invention also provides a mobile communication device having a communications transceiver operable in a direct communication mode to communicate with a peer mobile communication device, and including a frequency synthesizer. Furthermore, the mobile communication device comprises a positioning receiver for receiving satellite positioning signals and determining a position of the mobile communication device. The positioning receiver and communications transceiver share a a reference oscillator for providing a reference frequency to the communications transceiver and the positioning receiver. The mobile communication device corrects its reference oscillator error by receiving a frequency correction message from a peer mobile communication device which allows the mobile communication device to determine a reference frequency offset of the reference oscillator. The reference frequency offset may then be used by the positioning receiver to compensate for the reference frequency offset in performing a location fix.

The invention further provides a method of determining a frequency offset of a reference oscillator of a mobile communication device, commencing by tuning a communications transceiver of the mobile communication device to an uncorrected nominal frequency, and then searching for a signal from a peer mobile communication device in a frequency band around the uncorrected nominal frequency. Assuming the peer mobile communication device is transmitting, the mobile communication device commences detecting the signal at an offset frequency. The offset frequency may be the uncorrected nominal frequency of the peer mobile communication device, and is offset from a nominal frequency. The nominal frequency referring to a precision frequency as measured by any applicable standard. The method commences by receiving a frequency correction message from the peer mobile communication device at the offset frequency. The frequency correction message including offset information quantifying the offset from the nominal frequency to the first frequency. The mobile communication device then commences determining a difference between the uncorrected nominal frequency and the nominal frequency using the offset information of the frequency correction message.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of acquiring a positioning signal from a global positioning satellite at a positioning receiver of an uncorrected mobile communication device, comprising:
    detecting, by a communications transceiver of the uncorrected mobile communication device, a signal transmitted by a corrected mobile communication device, the signal being at an uncorrected nominal frequency of the corrected mobile communication device, the uncorrected nominal frequency being offset from a nominal frequency due to a frequency error of the corrected mobile communication device, the communications transceiver being operable to facilitate direct, peer-to-peer communication between the uncorrected mobile communication device and the corrected mobile communication;
    tuning the communications transceiver of the uncorrected mobile communication device to the uncorrected nominal frequency of the corrected mobile communication device from an uncorrected nominal frequency of the uncorrected mobile communication device;
    determining, by the uncorrected mobile communication device, a tuning offset between the uncorrected nominal frequency of the uncorrected mobile communication device and the uncorrected nominal frequency of the corrected mobile communication device;
    receiving a frequency correction message at the uncorrected mobile communication device from the corrected mobile communication device at the uncorrected nominal frequency of the corrected mobile communication device, the frequency correction message including reference oscillator offset information of the corrected mobile communication device;
    extracting the reference oscillator offset information of the corrected mobile communication device from the frequency correction message at the uncorrected mobile communication device;
    comparing the reference oscillator offset information of the corrected mobile communication device and the tuning offset to determine a reference offset of a reference oscillator of the uncorrected mobile communication device from the nominal frequency;
    providing the reference offset of the reference oscillator of the uncorrected mobile communication device to the positioning receiver of the uncorrected mobile communication device, the positioning receiver sharing the reference oscillator with the communications transceiver; and
    adjusting a positioning receiver tuning in response to the reference offset to receive the positioning signal.

2. The method of claim 1, further comprising:
    prior to detecting the frequency correction message transmitted by the corrected mobile communication device, broadcasting a frequency assistance message from the communications transceiver of the uncorrected mobile communication device.

3. The method of claim 1, wherein tuning the communications transceiver of the uncorrected mobile communication device to the uncorrected nominal frequency of the corrected mobile communication device comprises adjusting a frequency synthesizer of the communications transceiver so that an output frequency of the frequency synthesizer used to down-mix a signal received at the communications transceiver is equal to the uncorrected nominal frequency of the corrected mobile communication device.

4. The method of claim 3, wherein adjusting the frequency synthesizer of the communications transceiver comprises adjusting a value of a digital control word latched by the frequency synthesizer, wherein the digital control word is used to control the output frequency of the frequency synthesizer.

5. The method of claim 4, wherein determining the tuning offset comprises determining the difference between the digital control word latched by the frequency synthesizer when the output frequency is equal to the uncorrected nominal frequency of the corrected mobile communication device and a nominal control word corresponding to the uncorrected nominal frequency of the uncorrected mobile communication device.

6. The method of claim 1, wherein detecting the signal transmitted by a corrected mobile communication device comprises:

tuning the communications transceiver to the uncorrected nominal frequency of the uncorrected mobile communication device;

sweeping the tuning of the communications transceiver in a band around the uncorrected nominal frequency of the uncorrected mobile communication device; and detecting an initial signal at the uncorrected nominal frequency of the corrected mobile communication device.

* * * * *